| | 0° 30° CYCLE INTERUPTION 30° | 90° | 180° | 270° | 360° |
|---|---|---|---|---|---|
| CLAMPING SLIDE 32 | MOVES TO CLOSED POS. | DWELLS IN CLOSED POSITION (FIG.7) AND CLAMPS FERRULE BETWEEN SURFACES 70, 72 | | | OPENS / DWELLS IN OPEN POS. (FIG.6) |
| SPINDLE 60 | MOVES FORWARD TO POS. OF FIG.8 | DWELLS IN FORWARD POSITION (FIG.8) | RETRACTS TO POS. OF FIG.9 | DWELLS IN RETRACTED POSITION | |
| MOVEMENT OF CAMMING COLLAR 108 RELATIVE TO SPINDLE 60 | COLLAR STATIONARY AS SPINDLE MOVES | MOVES FORWARD ON SPINDLE | MOVES FURTHER FWD. ON SPINDLE TO CLOSE FINGERS 206, 208 | DWELLS IN FWD. POSITION ON SPINDLE | RETRACTS / DWELL IN RETRACTED POS. ON SPINDLE |
| CUTTING BLADE 124 | DWELLS OPEN | MOVES INTO CABLE | DWELLS CLOSED | | OPENED / DWELL |
| CUTTING BLADE 132 | DWELLS OPEN | MOVES INTO CABLE | DWELLS CLOSED | | OPENED / DWELL |
| ARMS 206, 208 | DWELL OPEN | | DWELL CLOSED WHILE SHIELDING IS FLAIRED CLOSED | | OPENED / DWELL OPEN |
| COAXIAL CABLE | END OF CABLE IS INSERTED THRU SLEEVE AND POSITIONED AGAINST SPINDLE DURING CYCLE INTERUPTION | CUTTING BLADES 124, 132 ARE MOVED AGAINST TO CUT INSULATION + SHIELDING | INSULATION AND SHIELDING STRIPPED FROM CABLE END | CENTER CONDUCTOR IS GRIPPED BY FINGERS | CENTER CONDUCTOR IS TWIRLED AND BRAID IS FLAIRED | INS. EJECTED |

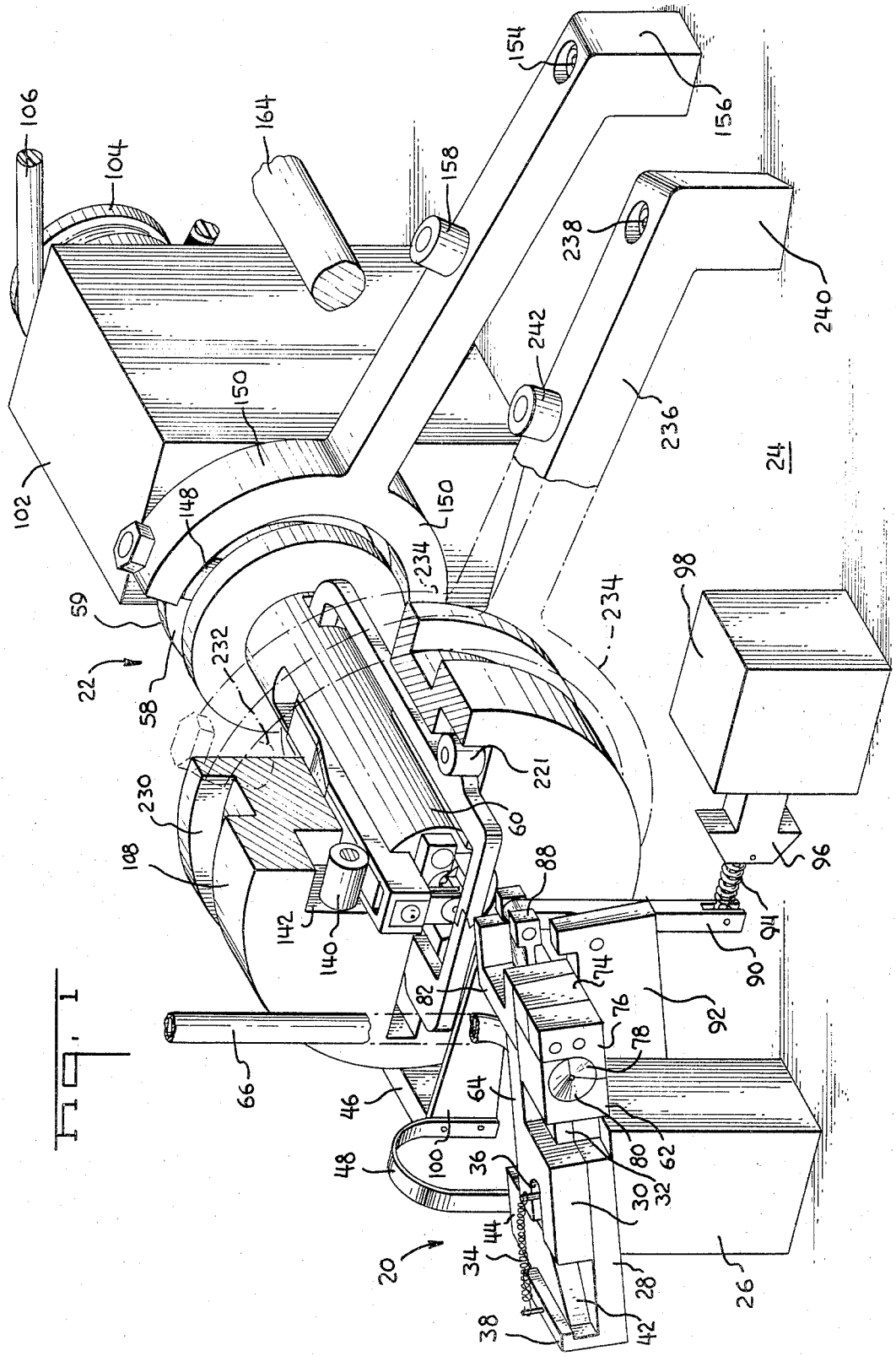

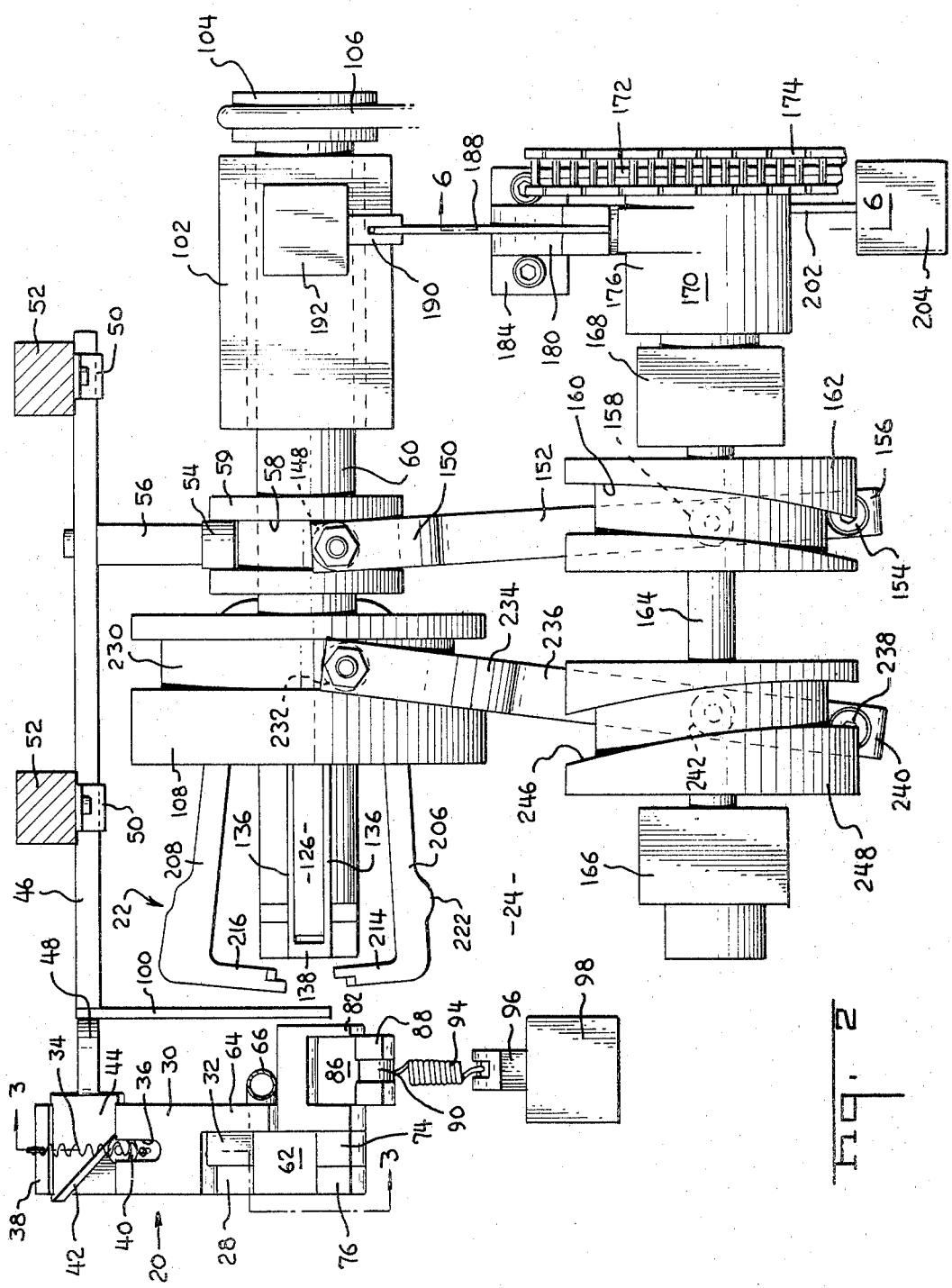

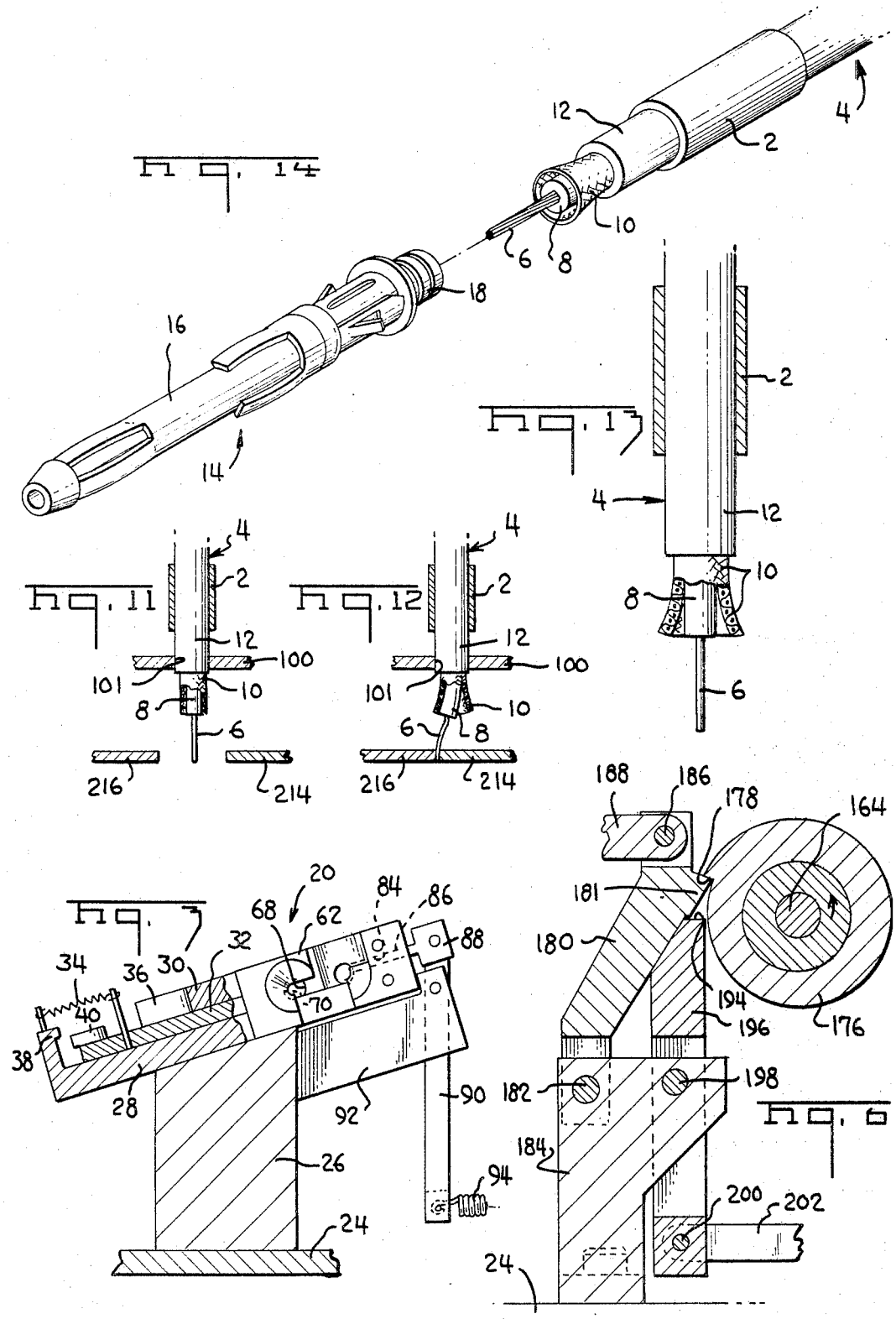

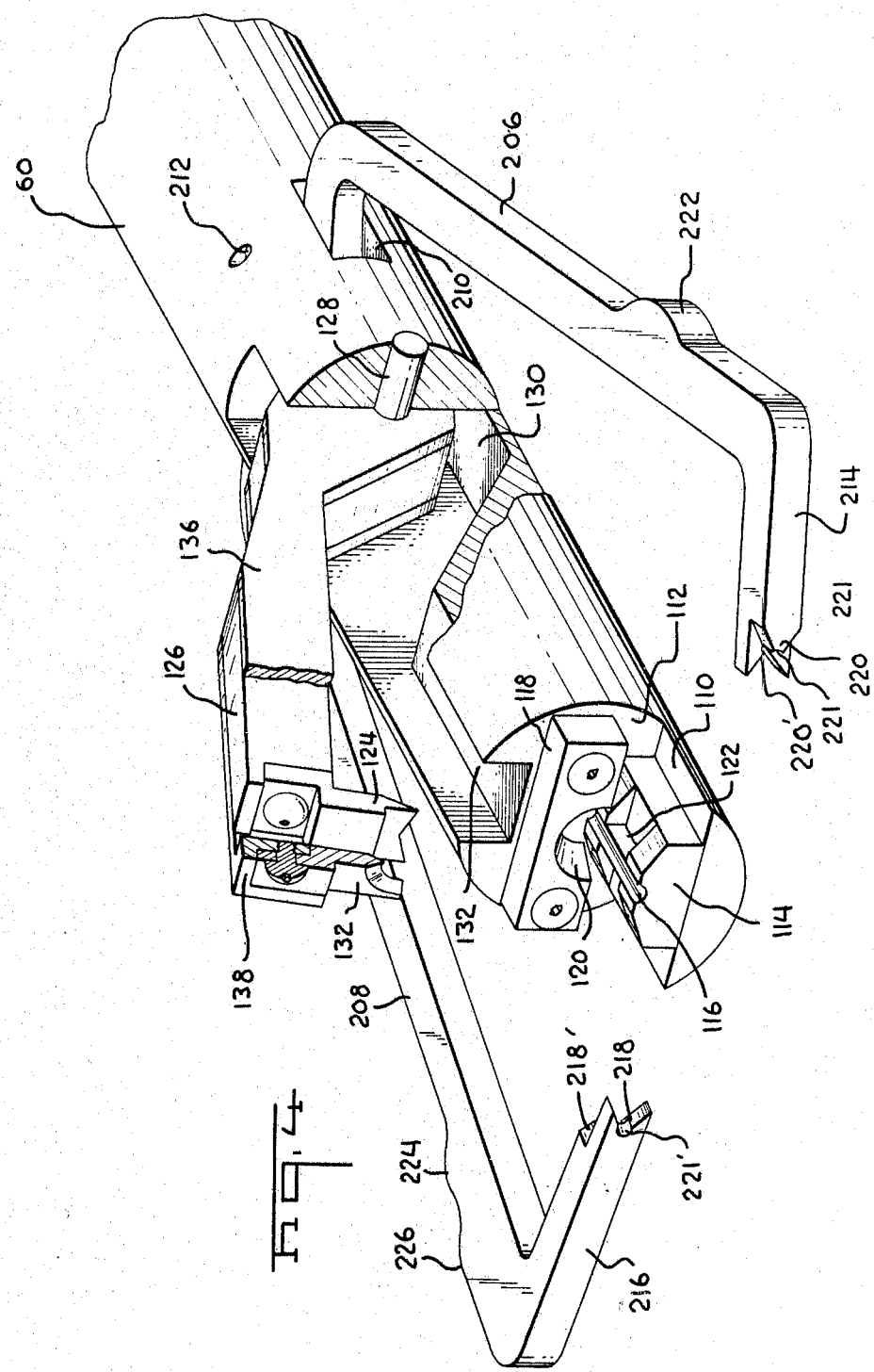

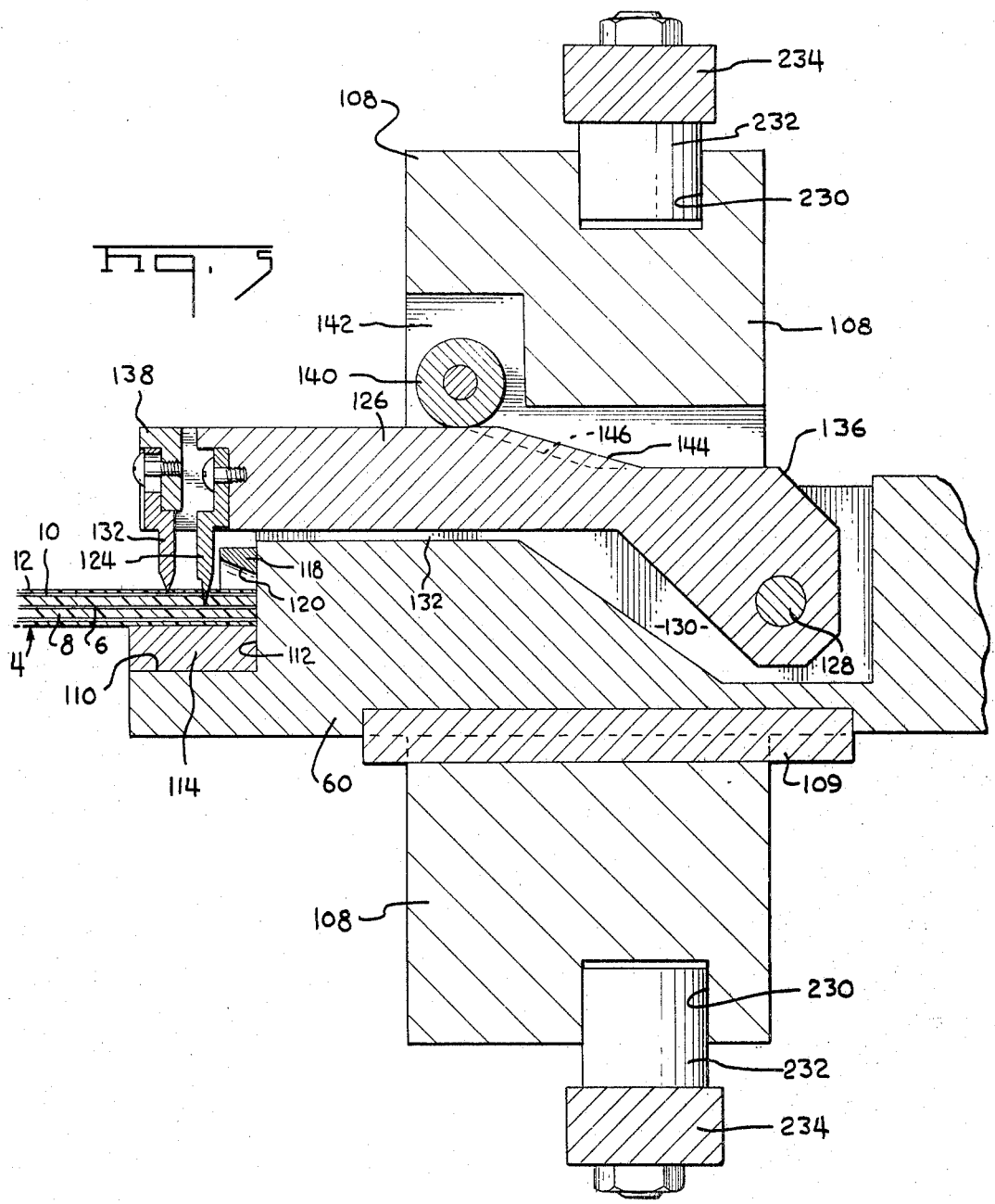

270° (STRIPPED CABLE END IS REMOVED AFTER END OF CYCLE

DEGREES OF ROTATION OF CAM SHAFT 164

Fig. 15

# United States Patent Office 3,484,936
Patented Dec. 23, 1969

3,484,936
SLEEVE ASSEMBLING AND INSULATION STRIPPING APPARATUS FOR COAXIAL CABLE
Glendon Henry Schwalm, Camp Hill, and Coey William Fritz, York, Pa., assignors to AMP Incorporated, Harrisburg, Pa.
Filed Oct. 30, 1967, Ser. No. 678,909
Int. Cl. B23p 19/04; H01r 43/04
U.S. Cl. 29—628                    9 Claims

ABSTRACT OF THE DISCLOSURE

Apparatus for assembling a sleeve to the end of a coaxial cable and stripping the cable end comprises sleeve feeding means which locates the sleeve in axial alignment with a stripping apparatus. Upon insertion of the cable through the feed sleeve, the end of the cable is located in the operating zone of the stripping apparatus. Stripping apparatus comprises means for stripping the end of the cable in a manner such that the center conductor and the shielding material are exposed. After the stripping operation has been carried out, the end portion of the shielding material is flaired so that it extends divergently with respect to the cable axis. The cable having the sleeve thereon can then be secured by crimping to a coaxial connecting device.

BACKGROUND OF THE INVENTION

The present invention is directed to the problem of preparing the end portion of a coaxial cable for attachment to a terminal by crimping. Coaxial cables comprise a center conductor which extends along a cable axis, an inner insulating sheath, a layer of metallic shielding material over the inner insulating sheath, and finally an outer insulating sheath which covers the shielding material. When cables of this type are to be connected to each other, it is common practice to use disengageable contact terminals of the pin and socket type which connect the center conductors of the cable to each other and which also connect the shielding materials of the cables to each other while maintaining the shielding material electrically isolated from the center conductors. U.S. Patent 3,315,337 shows one type of contact terminal for coaxial cable in which a cylindrical sleeve is positioned on the cable prior to crimping and this sleeve is crimped onto the shielding material which is located in surrounding relationship to the outer portion of the terminal thereby to electrically connect the shielding material to the outer metallic portion of the terminal. The center conductor of the cable is crimped in a separate operation to a separate sleeve contained within the terminal. The present invention is particularly directed to the problem of preparing the end of a coaxial cable for attachment to contact terminals of this general type.

It is accordingly an object of the invention to provide an apparatus for assembling a sleeve to the end of the cable and stripping insulation from the cable end. It is a further object to provide an apparatus which strips the insulation and a portion of the shielding from the end of a coaxial cable and flairs the shielding material in order to facilitate crimping of an electrical terminal onto the cable end. It is a further object to provide an improved apparatus for stripping the end of a coaxial cable. It is a further object to provide an apparatus for preparing a coaxial cable for termination which is substantially foolproof and which can be operated by an unskilled technician, with a minimum of training and supervision.

These and other objects of the invention are achieved in a preferred embodiment thereof comprising a sleeve feeding device and a cable stripping and shielding flairing device, the feeding device and the stripping device being located adjacent to, and in axial alignment with each other. The sleeve feeding means is arranged to feed sleeves in a manner such that during each operating cycle, a sleeve is located in front of the stripping means so that when the operator inserts the end of the cable through the sleeve feeding device, a sleeve will be located on the cable adjacent to its end. The cable stripping means is of the rotary type and has stripping blades adapted to strip the cable to different depths so that a portion of the center conductor is exposed at the cable end and adjacent to the cable end a portion of the shielding material is also exposed. The stripping mechanism also includes means for flairing the shielding material relative to the cable axis so that after the end of the cable is withdrawn from the apparatus, the sleeve will be located behind the flaired shielding material and the stripped end of the cable can be positioned in an uncrimped contact terminal and the flaired shielding can be positioned around the rearward surface of the terminal preparatory to crimping of the sleeve onto the shielding and the rearward end of the terminal.

In the drawings:

FIGURE 1 is a perspective view, with some parts broken away and other parts omitted in the interest of clarity, of a preferred embodiment of the invention;

FIGURE 2 is a top plan view of the embodiment of FIGURE 1 showing the positions of the parts at the beginning of the operating cycle;

FIGURE 3 is a view taken along the lines 3—3 of FIGURE 2;

FIGURE 4 is a fragmentary perspective view showing the spindle on which the cutting blades and flairing mechanism are mounted;

FIGURE 5 is a sectional side view of the forward end of the spindle showing the cutting blades in their closed positions relative to an inserted cable;

FIGURE 6 is a view taken along the lines 6—6 of FIGURE 2;

Figure 7:
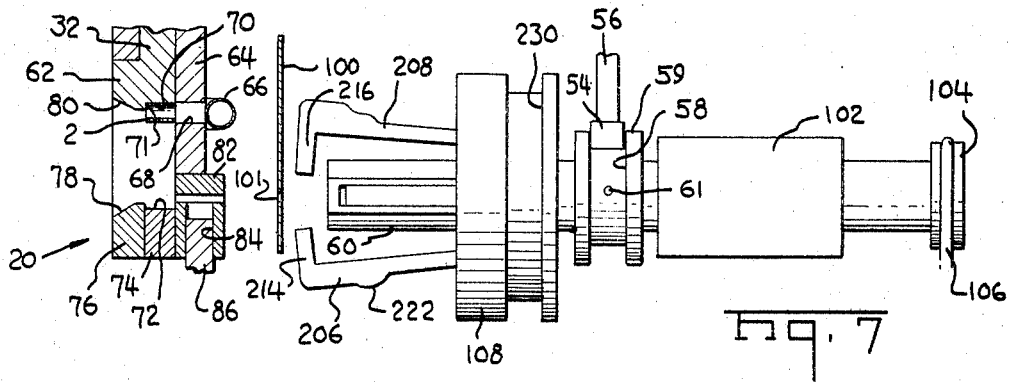
FIGURE 7 is a fragmentary plan view, partially in section, of the sleeve feeding mechanism and the spindle, this view showing the positions of the parts at the beginning of an operating cycle.
Figure 8:
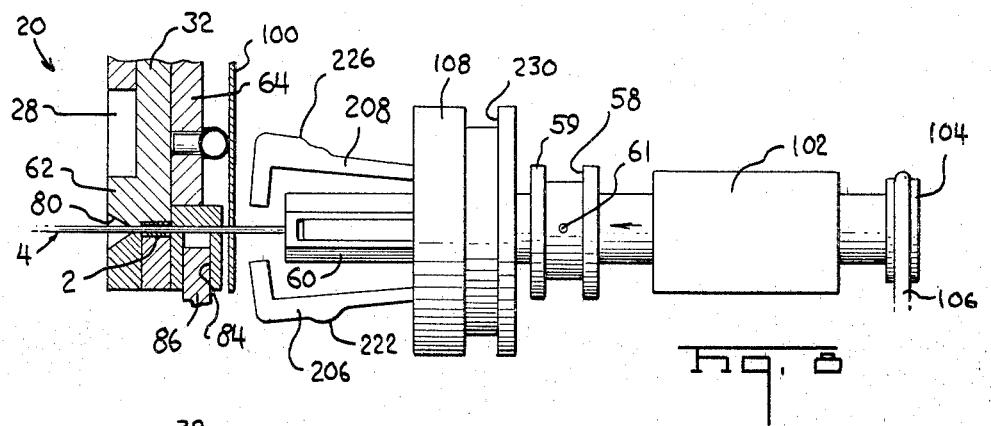
Figure 9:
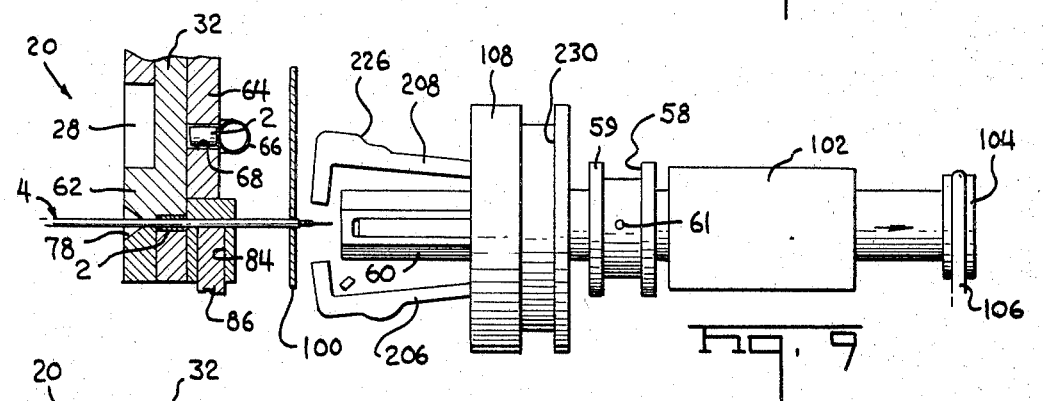
Figure 10:
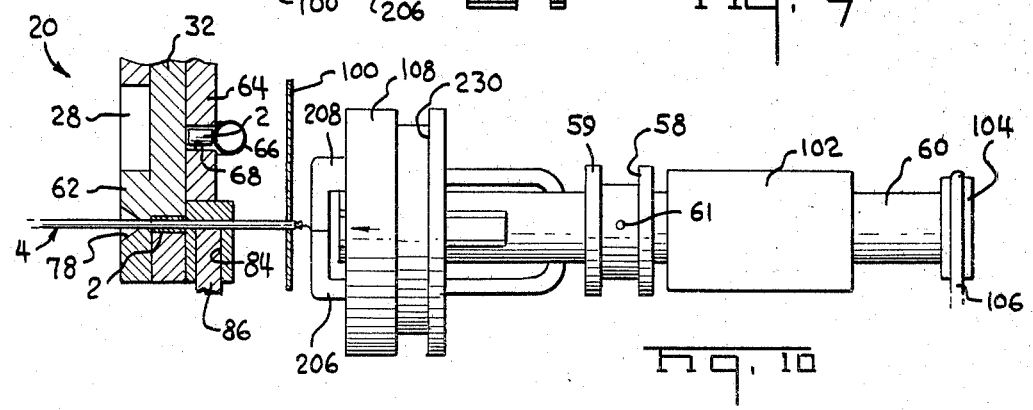

FIGURE 8, 9, and 10 are views similar to FIGURE 7 but showing the positions of the parts at different stages of the operating cycle;

FIGURE 11 is a fragmentary view showing the end of a stripped cable in the apparatus at a time immediately before the flairing operation;

FIGURE 12 is a view similar to FIGURE 11 illustrating the flairing operation;

FIGURE 13 is a view of the end portion of the cable which has been prepared for attachment to a contract terminal;

FIGURE 14 is a perspective view of a contact terminal and a cable in alignment therewith; and FIGURE 15 is a timing diagram which explains the sequence of operation of the disclosed embodiment of the invention.

Referring first to FIGURE 14, the disclosed embodiment of the invention is adapted to assemble a sleeve 2 to the end of a coaxial cable 4 and prepare the end of a cable for attachment to a contact terminal 14. The coaxial cable 4 comprises an inner conductor 6 which may be of stranded copper wire, an inner insulating sheath 8, a layer of woven or braided metallic shielding material 10 which surrounds the inner insulation 8, and finally, an outer insulation sheath 12 which surrounds the shielding material 10. The contact terminal 14 which is adapted to be crimped onto the cable end has an outer metallic cylindrical portion 16, a layer of insulation within this outer metallic ferrule, and an inner ferrule (not shown) which is adapted to be crimped onto the center conductor 6 of the cable 4. At the time of crimping, the cable 4 is inserted into the terminal so that the inner conductor enters the inner ferrule of the terminal 14. The shielding material 10 is positioned in surrounding relationship to the rearward end 18 of the outer terminal portion and the sleeve 2 is positioned over, and crimped onto, the rearward end 18 of the terminal. The co-pending application of Coey W. Fritz and Glendon H. Schwalm, Ser. No. 679,148, filed Oct. 30, 1967, discloses and claims a specific apparatus for crimping contact terminals of the type shown at 14 onto the thus prepared cable end.

Referring now to FIGURES 1–3, the disclosed form of apparatus for preparing the end of the cable 4 for attachment to the terminal 14 comprises a sleeve assembling means 20 which is mounted on a suitable support plate 24 in alignment with cable end stripping device generally indicated at 22. The sleeve assembling means is supported on the inclined upper surface of a pedestal 26 and comprises a base plate 28, a reciprocable slide 32 on the upper surface of the base plate, and a cover plate 30 secured to the base plate in straddling relationship to the slide. Slide 32 is leftwardly biased as viewed in FIGURE 3 towards a flange 38 on the lefthand side of the base plate 28 by means of a spring 34. One end of this spring is secured to a pin which extends from the slide member through a slot 36 in the cover plate 30 and the other end of the spring is secured to a pin extending from the flange 38. A roller bearing 40 on the upper surface of the slide member bears against an inclined camming surface 42 of a camming block 44. This camming block is slidably supported on the surface of base plate 28 and is connected by means of an arcuate leaf spring 48 to the end of a control rod 46. The control rod extends rearwardly beside the stripping apparatus 22 and is supported in suitable guides 50 which are mounted against the sides of pedestals 52 extending from the base plate 24. An arm 56 is integral with, and extends laterally from, the control rod 46 intermediate its end and has a roller 54 on its end which is disposed in a track 58 of a collar 59. This collar is secured by means of pins 61 to a continuously rotating spindle which, during the operating cycle, moves axially towards and away from the sleeve assembling apparatus 20 as will be described below.

Referring particularly to FIGURES 3 and 7, the head portion 62 of the slide 32 has a semi-cylindrical pocket 70 which conforms to the diameter of the sleeves 2. When the slide member 32 is in its retracted position, this pocket is disposed beside, and in axial alignment with, a cylindrical opening 68 in an arm 64 which is integral with the cover plate 30. The individual sleeves 2 are delivered to the opening 68 and fed to a position in front of the head portion 62 of the slide 32 by means of a guide tube 66. The individual sleeves may be loaded into this guide tube by means of any suitable automatic loading device, for example, by means of a vibratory feeding unit or similar automatic feeding device. The leading sleeve 2 of the succession of sleeves being fed will thus be located as shown in FIGURE 7 in front of the slide member and against a shoulder 71 at the end of the pocket 70 so that upon lateral movement of this slide member, this leading sleeve will be fed laterally and will be held in axial alignment with the insuation stripping device 22.

A block 74 is mounted on the support plate 30 in opposed relationship to the head portion 62 of slide 32, this block having a similar semi-cylindrical pocket 72 on its side which is opposed to the pocket 70. An additional block 76 is mounted on the support plate beside the block 74 and has an outwardly facing conical lead-in surface 78 for the cable, which is used to guide the cable into the apparatus and through the sleeve to the wire stripping device. The head portion 62 of the slide 32 has a complementary conical surface 80, the arrangement being such that when the slide moves from the position of FIGURE 7 to the position of FIGURE 8, a circumferentially continuous conical lead-in surface is provided to guide the end of the cable through the sleeve.

After the end of the cable has been inserted through the sleeve which is clamped between the surfaces 70, 72, it is necessary to clamp the cable end while the stripping and flairing operations are being carried out. Such clamping of the cable end is achieved by means of a movable clamping member 86 which is slidably mounted in a recess 84 of a fixed block 82 secured to the cover plate. As shown best in FIGURE 9, upon movement of this movable clamping member 86 towards an inserted cable, the end portion of the cable is clamped and held firmly while the stripping operation is being carried out. The clamping member 86 is pivotally mounted in a clevis 88 on a lever 90. The lever 90, in turn, is pivotally connected intermediate its ends to a plate 92 extending from the pedestal 26 and the lower end of the lever is connected by means of a spring 94 to the plunger 96 of a solenoid 98. It will be apparent from FIGURE 1 that when the solenoid 98 is energized, the plunger 96 will move rightwardly in FIGURE 1 thereby swinging the lever 90 in a counterclockwise direction about its pivotal axis and moving the movable clamping member from the position of FIGURE 8 to the position of FIGURE 9.

It is desirable to support the portion of the cable which is immediately adjacent to the stripping mechanism 22 against undue lateral deformation while the stripping and flairing operations are being carried out. Such support for the cable end is provided by means of a wire support arm 100 which extends laterally from the end of the control rod 46, and which has an opening 101 for reception of the cable. As best shown in FIGURE 7, this opening is in axial alignment with the insulation stripping mechanism 22 and with the sleeve held in the sleeve feeding mechanism 20 so that upon insertion of the cable, the cable will extend through the sleeve and through opening 101 into the stripping and flairing mechanism.

The previously identified spindle 60 is supported in, and extending through, a suitable bearing block 102 mounted on the support plate 24. The end of the spindle 60 extends beyond this bearing block and has a pulley 104 on its end which is coupled by a belt 106 to a suitable motor (not shown). The spindle is rotated continuously by this motor at a speed of about 800 to 900 r.p.m. As shown in FIGURES 4 and 5, the forward end of the spindle 60 is transversely milled to define a mounting platform 110 and a recessed face 112. An anvil 114 is secured to the platform 110 and has a semi-cylindrical upper surface 116, the radius of which is substantially equal to the radius of the cable and which is adapted to support the cable during the insulation cutting operations. Recesses 122 are provided intermediate the ends of the anvil on each side of the supporting surface 116 to provide clearance for the cutting blades as will be described below. A block 118 is secured to the face 112 of the spindle and has a conical guide surface 120 which functions to guide the end portion of an inserted cable against the support surface 116 so that the cable axis will coincide with the axis of the spindle during the insulation cutting operation.

Two separate cutting blades 124, 132 are provided for stripping the insulation from the end of the cable in a manner such that the center conductor and the shielding material will both be exposed after the stripping operation has been carried out. The blade 124 is secured by a fastener to the end of a mounting arm 126 which is disposed in an axially extending slot 132 in the spindle. The enlarged right hand end of this arm (as viewed in FIGURE 5) is received in a recess 130 at the inner end of slot 132 and is pivotally mounted on a pin 128 extending transversely through the spindle. As illustrated in FIGURE 5, this blade is adapted to cut entirely through the outer insulation, through the shielding material, and through the inner insulation 8 of the cable to expose the inner conductor 6. The outer cutting blade 132 is secured to a strap member 138 which is integral with a pair of arms 136. The arms 136 straddle the arm 126 and are, like the arm 126, pivotally mounted on the transversely extending pivot pin 128. The blade 132 is dimensioned such that when the arms are moved downwardly into their cutting positions (FIGURE 5), this blade will cut only through the outer insulating sheath of the cable to expose a portion of the shielding material 10.

During continuous rotation of the spindle 60, these arms will normally be thrown radially outwardly and away from the spindle axis and, therefore, away from the cable by virtue of the centrifugal force. The arms are cammed inwardly to move the blades against the end of an inserted cable by means of a cam follower 140 mounted in recess 142 in a slidable camming collar 108. This collar is keyed as shown at 109 (FIGURE 5) to the spindle 60 so that it will rotate with the spindle and is also permitted to move axially with respect to the spindle in order to accomplish camming of the arms 126, 136 towards the cable. As shown in FIGURE 5, the upper sides of the arms 126, 136 against which the follower 140 bears are not identical, the contours of these sides being such that the arm 126 is moved downwardly and against the cable prior to movement of the arms 136 so that the cutting operation carried out by the blade 124 will be completed in advance of the cutting operation carried out by the blade 132. This arrangement is desirable in order to ensure complete circumferential cutting of the outer insulation, the shielding material, and the inner insulation by the cutting blade 124. The cable must be stationary (rather than spinning with the spindle) while the cutting operation by the blade 124 is being carried out. If the cutting blade 132 were to cut through the outer insulation 12 prior to movement of the blade 124 against the outer insulation, the severed section of the outer insulation (severed by blades 132) might tend to spin with the spindle and the blade 124 would merely cut into the cable but would not move relatively around the spinning cable and a continuous circumferential cut would not be obtained.

The spindle 60 is moved axially towards the sleeve assembling device 20 by means of rollers 148 which are mounted on the ends of arcuate arms 150 extending from lever 152. The rollers 148 are disposed in the track 58 of the previously identified collar 59, this collar being secured to, and therefore, rotatable with spindle 60. The lever 152 extends transversely past a cam shaft 164 and has an enlarged end 156 which is pivotally mounted by means of a pin 154 on the base plate 24. Intermediate its ends, a roller 158 is mounted on the upper surface of the lever 152 and is received in a cam track 160 of a collar 162. The collar 162, in turn, is secured to the cam shaft 164 which extends beside and parallel to the spindle 60. Cam shaft 164 is mounted in suitable bearing blocks 166, 168 and extends rightwardly as viewed in FIGURE 2, through a clutch housing 170 as shown in FIGURE 6. It will be apparent that during rotation of the cam shaft 164, the lever 152 is swung about its pivotal axis 154 thereby to move the collar 59 and the spindle 60 axially towards and away from the sleeve assembling mechanism 20.

The camming collar 108 is moved relatively along the spindle 60, by means of rollers 232 which are disposed in a channel or groove 230 on the surface of the camming collar 108. These rollers are mounted on the ends of arcuate arms 234 which extend from a lever 236 having an enlarged end 240 which is pivoted at 238 to the support plate 24. Intermediate its ends, the lever 236 has a roller 242 on its upper side which is received in a camming slot 246 of a collar 248. This collar is mounted on, and secured to, the cam shaft 164. Again, during the rotation of the cam shaft, the lever 236 will be swung about its pivotal axis 238 thereby to move its end portions toward and away from the sleeve assembling mechanism 20.

The timing of the movement of this collar is described in the timing diagram (FIGURE 15) and is discussed in further detail below.

A complete operation cycle of the mechanism encompresses a complete revolution of the cam shaft 164, however, the cycle is interrupted as shown on the timing diagram and as discussed below, after the spindle 60 is moved relatively leftwardly in FIGURE 2 and its end is disposed adjacent to the sleeve assembling mechanism. This interruption of the cycle is achieved by means of the clutch mechanism which will now be described with particular reference to FIGURE 6. As shown in FIGURE 6, a collar 176 is mounted on, and keyed to the shaft 6, and has a generally spiral surface defining a notch or shoulder 178. At the beginning of the operating cycle, the shoulder 178 is disposed against a tooth 181 of a lever 180, the end of this lever being pivotally mounted at 182 on a support block 184. The upper end of the lever 180 is pivotally connected at 186 to a link 188 which, in turn, extends to the plunger 190 of a solenoid 182 mounted on the upper surface of the bearing block 102. It will be apparent then that when the solenoid 192 is energized, the link 180 will be swung through a slight counterclockwise arc as viewed in FIGURE 6, thereby disengaging the tooth 181 from the shoulder 178 and permitting the shaft 164 to rotate. The rotation of the shaft 164 is, however, arrested or interrupted shortly after the movement of the tooth 181 away from the shoulder 178 by means of a second stop member 196 having a tooth 194 on its upper end which is also adapted to engage the shoulder 178. The lever 196 is pivoted at 198 to the block 184 and is pivoted at its lower end 200 to a link 202. The link 202, in turn, is pivotally connected to the plunger of a solenoid 204. The interrupted cycle can thus be continued by energizing the solenoid 204 to disengage the tooth 194 from the shoulder 178. The shaft 164 is connected by a conventional slip clutch (not specifically shown) to a continuously rotating sprocket 172, which, in turn, is coupled by a chain 174 to a relatively low speed power source such as a speed reducer coupled to an electric motor. The speed of rotation and of the sprocket 172 is relatively low as compared with the speed of rotation of the spindle 60, for example, 30 r.p.m.

After the insulation and a portion of the shielding material has been stripped from the end of the cable, that is, after the cable has been prepared as shown in FIGURE 11, the exposed section of the shielding material is outwardly flaired by means of a pair of arms 206, 208 which will now be described.

Referring to FIGURE 4, the rearward ends of these arms 206, 208 extend into recesses 210 in the sides of the spindle 60 and are pivotally mounted on parallel spaced-apart pivot pins 212 extending through the spindle on each side of the axis thereof. The forward ends of the arms 206, 208 extend beyond the end of the spindle and have inwardly directed wire gripping fingers 214, 216. During normal rotation of the spindle and while the camming collar 108 is in the position of FIGURES 8 or 9, these arms will be swung outwardly by centrifugal force. The arms are cammed inwardly by relative movement of the camming collar 108 with respect to the spindle as will be described below.

The end of the wire gripping finger 216 of the arm 208 is notched on its forward side as shown at 218 and the corresponding end of the wire gripping finger 214 of the arm 206 is pointed as shown at 220. On the rearwardly facing side of the gripping finger 214 of arm 206, however, there is provided a notch 220′ while on the rearwardly facing side of the gripping finger 216 of arm 218, there is provided an inclined pointed section which is adapted to enter the notch 220′. The ends of the fingers 214, 216 are additionally provided with cylindrical recesses or pockets 221, 221′ at the roots of the notches 218, 220′, and extending across the apieces of the pointed sections 220, 218′. The radius of these recesses is somewhat greater than the radius of the inner conductor 6 so that the inner conductor will be confined, but not tightly gripped, when the fingers are against each other.

During the forward movement of the camming collar 108 relative to the spindles 60, the arms 206, 208 are cammed inwardly by means of rollers 221 (FIGURE 1) mounted in recesses in the camming collar and adapted to bear against the outwardly facing edges of the arms. These outwardly facing edges of the arms are provided with protrusions, 222 on the arm 206 and 224, 226 on the arm 208, which function to time the inward movement of the arms. Particularly, the protrusion 222 is located such that the arm 206 will move inwardly in advance of inward movement of the arm 208 but will then move radially outwardly as the camming collar moves and the roller 221 is moved beyond the protrusion 222. The arm 208 is subsequently moved inwardly by virtue of the inclined contour surfaces 224, 226.

The locations and contours of these protrusions are such that the arms move inwardly towards each other and grip the center conductor of the cable at the beginning of the flairing operation. Subsequently, the arm 208 is moved further inwardly so that the end of the center conductor is located off-center with respect to the cable axis, see FIGURE 12. The rotation of the spindle while the center conductor is thus gripped causes the inner insulating sheath to be twirled relative to the cable axis and thereby move the shielding material outwardly until it is flaired as viewed in FIGURE 13.

The operation of the disclosed embodiment will be apparent from the foregoing description taken in conjunction with the timing diagram, FIGURE 15. At the beginning of the operating cycle, the parts will be in the position of FIGURES 2 and 7 with the spindle 60 in its retracted position and with the cutting blades and the arms 206, 208 in their open positions. The operator first energizes the solenoid 192 thereby to cause shaft 164 to rotate through an angle of about 30°. The rotation of the shaft 164 actuates arcuate slide 32 and positions a sleeve between the conical gripping surfaces 70, 72 in alignment with the opening in the block 82. After this limited rotation of shaft 164, the shoulder 178 moves against the tooth 194 of the arm 196 and the shaft 164 comes to rest.

During this initial portion of the operating cycle, the spindle 60 is moved forwardly by the action of the cam track 160 and the front end of the spindle is positioned adjacent to the support arm 100 so that the parts occupy the positions of FIGURE 8. While the cam shaft 164 is at rest, that is, the cycle interruption, the operator inserts the end of an unstripped cable through the sleeve held between the gripping surfaces 70, 72 through the opening 101 in the support arm 100 and against the face of the spindle. The end portion of the cable will thus be supported on the conical support surface 116 of the anvil 114. The operator then energizes the solenoids 204 and 98 by closing a suitable switch (not shown) thereby to disengage the tooth 194 from the shoulder 178 thus permitting the cam shaft 164 to be driven through the remaining portions of a complete revolution and clamp the inserted cable by clamping block 86. During rotation of the cam shaft, the camming collar 108 moves forwardly thereby to urge the arms 126, 136 downwardly and move the blades against the surface of the cable. The camming collar 108 dwells in its forward position for a brief interval to assure complete circumferential cutting by both blades of the cable. As pointed out previously, during this interval, the blade 132 cuts only through the outer insulating sheath of the cable while the blade 124 cuts through the outer insulating sheath, the shielding material, and through the inner insulation sheath. The camming collar and spindle then retract to its positions shown in FIGURE 9. At this time in the cycle, the end of the spindle will be relatively remote from the sleeve assembling apparatus and the inwardly directed ends of the arms 206, 208 will be disposed on each side of the exposed end of the inner conductor 6. The camming collar is then moved leftwardly from the position of FIGURE 9 to the position of FIGURE 10 under the influence of the cam track 246 to close the arms 206, 208 and confine the end of the exposed inner conductor 6. As previously noted, the camming protuberances 222, 224, 226 on the outwardly facing edges of these arms are such that when the camming collar moves to the limit of its forward motion, the end of the inner conductor 6 is held slightly off-center with respect to the cable axis. With the end of the inner conductor thus held, the continuous rotation of the spindle has the effect of twirling the inner conductor along a circular path surrounding the cable axis. As illustrated in FIGURES 11 and 12, the inner conductor carries with it the inner insulating sheath as it moves along this circular path and pushes the shielding material outwardly thereby deforming it to produce the generally conical flair illustrated in FIGURE 13. As illustrated in the timing diagram, this twirling takes place for an interval encompassing about 100° of rotation of the cam shaft 164. At the conclusion of this twirling operation, the camming collar 108 is retracted under the influence of the cam track 246 and the parts assume the position shown in FIGURE 7. The solenoid 98 is deenergized by a suitable trip-switch (not specifically shown) thereby to release the cable from the clamping blocks and the cable can be withdrawn through the opening 101 and through the opening in the block 82. The sleeve through which the cable is originally inserted remains on the cable so that a prepared cable end as shown in FIGURE 13 results.

A salient feature of the invention is the provision of the means for flairing the exposed shielding material on the cable end concomitantly with stripping of the insulation and a portion of the braiding material from the cable end. It will be apparent from FIGURE 13 that the sleeve could not be moved onto the cable after flairing of the shielding material and an additional important feature of the invention is thus the means for assembling this sleeve to the cable prior to stripping of the insulation and flairing of the braiding material.

A further important feature of the invention is the provision of the different camming surfaces on the upper sides of the arms 126, 136 which results in cutting of the insulation by the blade 124 through the cable to the inner conductor prior to cutting of the outer insulation sheath by the blade 132. This construction prevents the section of insulation, braiding, and inner insulation which is severed by the blade 124 from rotating with the spindle and also prevents other portions of the cable from rotating with the spindle thus assuring complete circumferential cutting of the outer insulating sheath by the blade 132.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. Apparatus for preparing the end portion of a coaxial cable for application of a coaxial terminal thereto comprising, a stripping means for stripping the shielding material and the inner insulation from the end of said cable thereby to expose the inner conductor and a portion of the shielding material, and flairing means for moving the inner conductor laterally of the axis of said cable thereby to deform said shielding material and to flair said shielding material obliquely outwardly whereby said center conductor can be inserted into the center ferrule of said terminal and the outer ferrule of said connector can be positioned between said flaired shielding material and said inner layer of insulation.

2. Apparatus as set forth in claim 1 wherein said stripping means comprises a rotary stripping means, said flairing means comprising means for gripping said inner conductor and twirling said inner conductor around the axis of said cable.

3. Apparatus as set forth in claim 2 including sleeve assembling means, said sleeve assembling means being disposed in front of said apparatus whereby a cable inserted through a sleeve held in said sleeve assembling means is presented to said apparatus.

4. Apparatus as set forth in claim 2 including sleeve feeding and assembling means disposed in front of said stripping means, said sleeve feeding and assembling means being adapted to hold a sleeve in axial alignment with said stripping means whereby a cable presented to said stripping means is inserted through said sleeve prior to stripping.

5. Apparatus for stripping insulation and shielding material from the end of a coaxial cable and for preparing the end of said cable for attachment to a coaxial contact terminal comprising:
   stripping means adapted to remove end portions of the insulation, the shielding material, and the outer insulation from the end of said cable, and
   means for each side of said stripping means for gripping the exposed center conductor and for moving said conductor laterally of the axis of said cable whereby, the end portion of inner insulation and the exposed portion of said shielding material is laterally deflected and said shielding material is outwardly deformed and flaired.

6. A method of preparing the end of coaxial cable for attachment to a coaxial contact terminal comprising the steps of stripping the insulation and a portion of the shielding material from the end of said cable to expose the center conductor of said cable and an adjacent portion of the shielding, and moving the center conductor laterally of its axis to deform the exposed shielding material radially outwardly and to flair said shielding material relative to the cable axis whereof said center conductor can be inserted into a coaxial contact terminal and said flaired shielding material can be positioned over the end of said terminal.

7. A method as set forth in claim 6 including the step of inserting said cable through a sleeve prior to stripping of said insulation and shielding material whereby, said sleeve can be moved over said flaired shielding material and onto said terminal.

8. A method as set forth in claim 7 wherein said cable has an outer layer of insulation over said shielding material, and including the step of stripping said outer layer of insulating prior to flairing.

9. A method as set forth in claim 6 wherein said center conductor is moved laterally by twirling said center conductor around the axis of said cable.

References Cited

UNITED STATES PATENTS

| | | |
|---|---|---|
| 1,526,063 | 2/1925 | Griffin. |
| 2,439,465 | 4/1948 | Gookin. |
| 2,998,633 | 9/1961 | Andrew. |
| 2,998,633 | 9/1961 | Andren. |
| 3,226,815 | 1/1966 | Kelly _____ 29—427 |
| 3,320,659 | 5/1967 | Jerome _____ 29—628 |

WAYNE A. MORSE, JR., Primary Examiner

U.S. Cl. X.R.

29—203, 241, 427, 433